US00RE34253E

United States Patent [19]

Fratty et al.

[11] E Patent Number: Re. 34,253

[45] Reissued Date of Patent: May 18, 1993

[54] MOTOR VEHICLE HEADLIGHT INCLUDING A SINGLE LIGHT SOURCE FOR GENERATING TWO DIFFERENT BEAMS

[75] Inventors: Hector Fratty, Paris; Joel Leleve, Epinay Sur Seine, both of France

[73] Assignee: Valeo Vision, Bobigny Cedex, France

[21] Appl. No.: 719,338

[22] Filed: Jun. 21, 1991

Related U.S. Patent Documents

Reissue of:

[64] Patent No.: 4,987,521
Issued: Jan. 22, 1991
Appl. No.: 467,860
Filed: Jan. 22, 1990

[30] Foreign Application Priority Data

Jan. 23, 1989 [FR] France ..... 89 00754

[51] Int. Cl.[5] ..... B60Q 1/00

[52] U.S. Cl. ..... 362/61; 362/277; 362/284; 362/303

[58] Field of Search ..... 362/61, 80, 282, 284, 362/303, 304, 277, 346

[56] References Cited

U.S. PATENT DOCUMENTS

| | | | |
|---|---|---|---|
| 1,205,224 | 11/1916 | Koechlein | 362/284 |
| 1,591,992 | 7/1926 | Nave | 362/284 |
| 4,443,834 | 4/1984 | Schafer et al. | 362/284 |
| 4,594,529 | 6/1986 | de Vrijer . | |
| 4,827,367 | 5/1989 | Luciani | 362/80 |

FOREIGN PATENT DOCUMENTS

| | | | |
|---|---|---|---|
| 84934 | 3/1983 | European Pat. Off. . | |
| 690678 | 9/1930 | France . | |
| 1296036 | 11/1962 | France | 362/284 |
| 2239862 | 2/1975 | France . | |
| 2536503 | 5/1984 | France . | |
| 2054815 | 2/1981 | United Kingdom . | |

*Primary Examiner*—James C. Yeung

[57] ABSTRACT

A motor vehicle headlight of the type comprising a single light source, a reflector including two zones suitable for generating two different respective light beams, a closure glass, and masking means situated in the vicinity of the source and capable of being displaced for selectively masking the light rays delivered by the source and propagating towards at least one of the two zones. According to the invention the two zones of the reflector are disposed side by side, each of them extending over the entire height of the reflector, each zone of the reflector is constituted by a portion of a reflecting surface sufficing on its own to generate the associated beam, and the masking means comprise at least one screen which, in its masking position, is situated to one side of the source.

10 Claims, 3 Drawing Sheets

MOTOR VEHICLE HEADLIGHT INCLUDING A SINGLE LIGHT SOURCE FOR GENERATING TWO DIFFERENT BEAMS

Matter enclosed in heavy brackets [ ] appears in the original patent but forms no part of this reissue specification; matter printed in italics indicates the additions made by reissue.

The present invention relates in general to motor vehicle headlights and more particularly it relates to a headlight capable of emitting two different types of light beam from a single light source by acting mechanically on the geometry of the co-operation between the source and the reflector.

BACKGROUND OF THE INVENTION

More precisely, the invention relates to a motor vehicle headlight of the type comprising a single light source, a reflector including two zones suitable for generating two different respective light beams, a closure glass, and masking means situated in the vicinity of the source and capable of being displaced for selectively masking the light rays delivered by the source and propagating towards at least one of the two zones.

A headlight of this type is already known in the prior art.

More precisely, French patent number 1 296 036 describes (page 2, righthand column) a particular embodiment of a headlight in which the filament is fixed relative to the reflector, and the reflector comprises a parabolic top portion whose focus is offset behind the filament in order to form a dipped beam, and a bottom portion which is also parabolic but which has its focus in the vicinity of the filament, so as to form a main beam in co-operation with the bottom portion. The two portions of the reflector are separated from each other at a horizontal plane including the optical axis, while the masking screen is suitable for selectively intercepting rays from the source propagating towards the bottom portion in order to change over between main beam and dipped beam.

A major drawback of a headlight of this type lies in the fact that since the dipped beam cut-off is directly created by the edge of the, or each, masking screen, and since mechanical play is inevitable in the design of such a moving masking screen, the position of the cut-off is not accurately defined, and this is not compatible with the photometric requirements laid down by various regulations.

This phenomenon is further accentuated in headlights of this type which satisfy current design trends, i.e. having a very small vertical extent while being very wide. This means that the cut-off is defined, at least with respect to the concentration images, by regions of the reflector which are very far from the source and the screen, thereby giving rise to undesirable amplification of any error in the positioning of the masking screen.

Another drawback of known headlights lies in the difficulty in enhancing the intensity of one beam to the detriment of the other. More precisely, given the above-mentioned requirement for small vertical extent, any attempt at increasing the light in one of the beams requires the reflector to be made wider. Unfortunately, in this case, the other beam also benefits from such an increase, such that the ratio between the quantities of light specific to each of the two beams remains substantially the same.

In addition, French patent Number 690 678 describes a headlight comprising a parabolic mirror having a matt or dull side zone which is permanently exposed to radiation from the source and having another zone which may be masked by a side masking element. This prior headlight is thus not capable of generating two different beams since it is only the maskable zone which is capable of forming a beam. This document is thus of no use in attempting to solve the problem to which the present invention relates.

The present invention seeks to mitigate the drawbacks of the prior art and to provide a headlight in which the photometric characteristics of the beam, and in particular the definition and the position of the cutoff of a dipped beam or of a foglight beam are independent of any possible play or inaccuracy that may exist in the position of a masking screen used for forming the beam in question.

Another object of the present invention is to provide a headlight of the type mentioned in the introduction and capable without difficulty of being very small in vertical extent, as required by present-day designs.

Yet another object of the present invention is to provide a headlight in which it is easy to modify the area of the reflecting zone attributed to each type of beam without having to modify the general configuration of the headlight.

Finally, the invention seeks to provide such a headlight in which the two beams formed can equally well be complementary or independent.

SUMMARY OF THE INVENTION

To this end, according to the present invention, the two zones of the reflector are disposed side by side, each of them extending over the entire height of the reflector, each zone of the reflector is constituted by a portion of a reflecting surface sufficing on its own to generate the associated beam, and the masking means comprise at least one screen which, in its masking position, is situated to one side of the source.

Preferred aspects of the headlight of the invention include the following:

at least one of the two zones of the reflector is constituted by a surface suitable, on its own, for generating a beam situated beneath a cut-off which extends generally horizontally, and may be constituted by a surface suitable for forming images of the light source whose topmost points are situated in the vicinity of the cut-off, the cut-off may be horizontal or it may be a cut-off delimited by a horizontal half-plane and by a half-plane which slopes above the horizontal, in which case the other zone of the reflector is preferably constituted by surface suitable for generating a concentrated beam on the vicinity of the optical axis;

the masking means comprise a single screen for selectively masking rays propagating from the source towards said other zone, or alternatively the masking means comprise two screens for selectively masking rays propagating from the source towards respective ones of the two zones of the reflector, in which case, the screen suitable for masking the rays propagating from the source towards the first zone of the reflector has at least one small orifice passing therethrough in order to allow a determined quantity of light to pass therethrough towards said first zone;

advantageously, the, or each, masking screen comprises a plate pivoted about a horizontal axis fixed to a direct light mask associated with the source, said plate being suitable for being moved into a masking position by drive means associated with transmission means, e.g. comprising gears and a crank system; finally, the source is preferably an arc lamp.

An essential advantage of a headlight of the invention lies in that the cut-off of the, or each, beam is not defined by the moving masking screen, but by the reflector itself. As a result the cut-off is defined with excellent positioning and sharpness regardless of any play, vibration, etc. that may have an effect on the position or the stability of the screen.

BRIEF DESCRIPTION OF THE DRAWINGS

Embodiments of the invention are described by way of example with reference to the accompanying drawings, in which.

DETAILED DESCRIPTION

Figure 1:
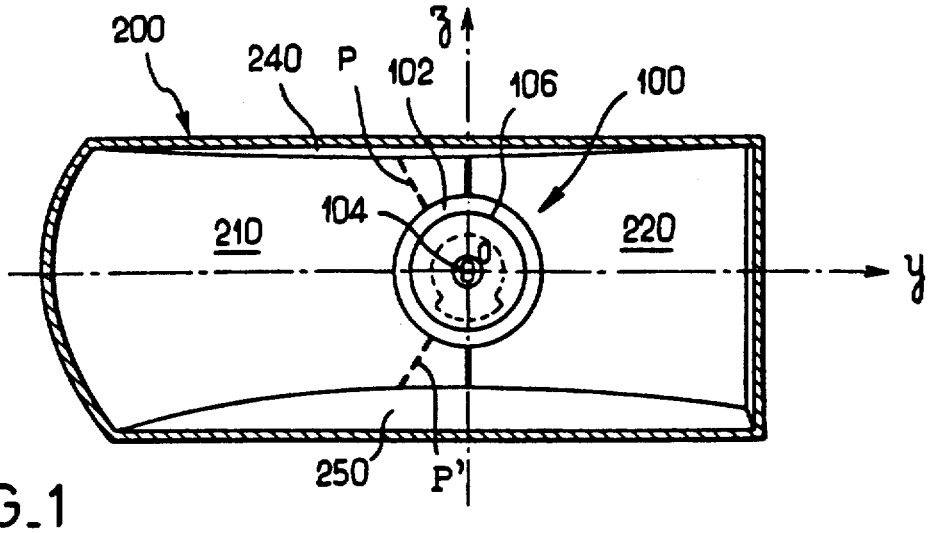
FIG. 1 is a simplified front view of a headlight of the invention.
Figure 2:
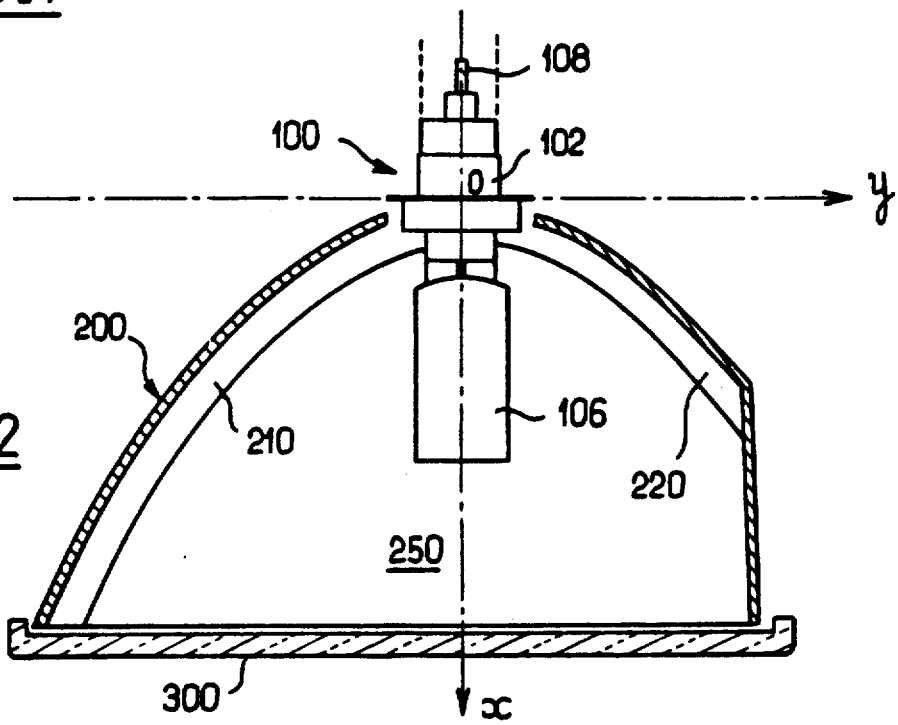
FIG. 2 is a horizontal section through the FIG. 1 headlight.
Figure 3:
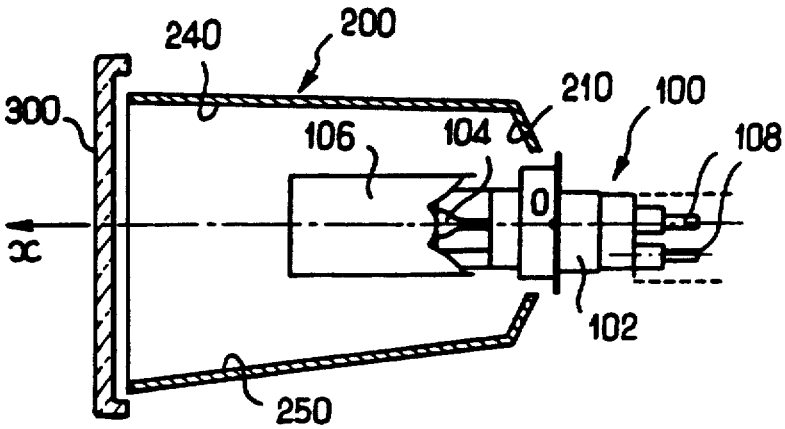
FIG. 3 is an axial vertical section through the headlights of FIGS. 1 and 2.

With reference initially to FIGS. 1 to 3 and 4a & 4b, a headlight of the invention comprises a lamp 100, a reflector 200, and a front closure glass 300. In this example the lamp is a discharge lamp suitable for producing an elongate electric arc between two electrodes disposed substantially axially in the vicinity of the optical axis Ox in well known manner. 102 and 104 respectively designate the base and the sealed bulb of the lamp. Its electrical terminals are referenced 108. Because of the large amount of light flux emitted by a lamp of this type, a direct light mask 106 is additionally provided in order to avoid dazzling drivers or pedestrians situated in front of the vehicle. In this case, the mask 106 is in the form of a circular cylinder which is closed at its front end and which has an open back end having a complex outline such that rays directed towards optically inoperative portions of the reflector (cheek pieces, . . . ) are intercepted by the mask.

Naturally, it would also be possible to use a filament lamp, e.g. a lamp having a tungsten filament, or any other type of lamp including a single light source.

The reflector 200 is constituted, in this case, by a reflector which is both low and wide, being truncated by substantially horizontal top and bottom cheeks 240 and 250. In accordance with an essential aspect of the invention, the reflecting surface 200 is divided into two distinct reflecting zones 210 and 220 respectively suitable for emitting two different types of light beam, and the separation between the two zones takes place in the present example along the axial vertical plane xOz of the headlight. It would alternatively be possible for the separation to run along two half-planes intercepting on the optical axis Ox, but sloping significantly relative to the horizontal, as indicated by dashed lines P and P'. The areas of the respective reflecting zones 210 and 220 can thus easily be altered, thereby altering the intensities of the two beams.

For example, the lefthand zone 210 (as seen from in front) of the reflector may be constituted by a portion of a reflecting surface suitable on its own for generating a V-shaped cut-off specific to standardized European dipped beams and without requiring assistance from a mask or the like. In practice, it may be constituted by one-half of one of the surfaces described in French patents or patent applications numbers 2 536 502, 2 599 121, and 2 609 148 in the name of the Applicant, and the respective contents thereof are hereby incorporated in the present description by reference, and further details may be obtained by reference thereto.

In the present example, the righthand zone 220 of the reflector constitutes a portion of a surface suitable for generating a beam which is essentially complementary to the dipped beam. It may be constituted, for example, by a portion of a paraboloid with the arc being off-center relative to the focus thereof, or else it may be constituted by one-half of a surface as described in French patent application number 2 600 024, with the contents thereof being likewise incorporated herein by reference and which should be referred to for further details.

Figure 4A:
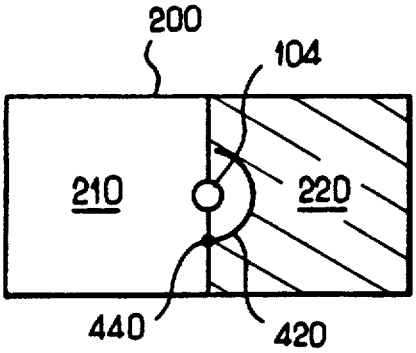
FIGS. 4a and 4b are diagrammatic front views of the headlight of FIGS. 1 to 3 showing two possible states thereof.
Figure 4B:
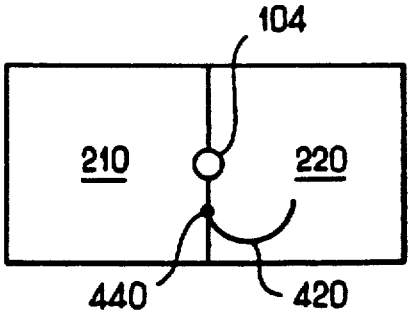

In addition, as shown diagrammatically in FIGS. 4a and 4b (but not shown in FIGS. 1 to 3 for reasons of clarity), the headlight includes a masking screen 420 which, in this case, is in the form of one half of a circular cylinder about a horizontal axis that coincides substantially with the optical axis, and which is hinged along one edge about an axis 440 parallel to the optical axis and situated beneath the lamp, with the hinge axis being mounted, for example, on the direct light mask 106.

Drive means (not shown), e.g. an electric motor or an electromagnet, suitable for being controlled from the vehicle cabin, serve to displace the screen 420 between a first or masking position (FIG. 4a) in which it comes against the mask 106 in order to intercept radiation from the arc of the lamp directed towards the zone 220 of the reflector, and a second or retracted position (FIG. 4b) in which it is moved away from the mask 106, with the zone 220 now being exposed to radiation. It can be observed that in this example the zone 210 is always exposed to radiation.

It is clear that in the situation shown in FIG. 4a, only the zone 210 is active, and as a result the beam which is formed is a European dipped beam. In this respect, it may be observed that the various surfaces mentioned above have the property of creating, on their own, the entire beam even when only half of the surface is used. Given the very large quantity of light delivered by an arc source, the intensity of the resulting beam is more than adequate.

In the situation of FIG. 4b, the entire reflector participates in creating the beam, and as a result the beam is constituted by superposing the dipped beam generated by the zone 210 and the complementary or additional beam generated by the zone 220, thereby constituting a main beam.

Referring now to FIGS. 5a to 5d, four ways are illustrated diagrammatically of using a headlight which has a first reflecting zone 210 suitable for forming a dipped beam on its own, and a second reflecting zone 220 in the form of a paraboloid focused in the vicinity of the arc of the lamp 100. Two masking screens 410 and 420, e.g. both mounted and hinged about a common axis 440 situated beneath the lamp 100, are associated with the zones 210 and 220 respectively for the purpose of exposing each of them selectively to the light delivered by the arc, or for masking them therefrom. This reflector is further characterized in that the masking screen 410 corresponding to reflector zone 210 includes one or more small orifices as indicated at 412 in order to allow a determined quantity of the light delivered by the arc to pass to the reflector.

Figure 5A:
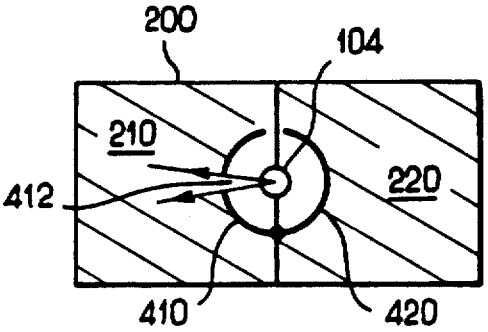
FIGS. 5a to 5d are diagrammatic front views showing four possible states of a variant headlight of the invention.

In FIG. 5a, both screens 410 and 420 are in the masking position, as shown, and only a small quantity of light from the arc can escape to the zone 210 which then reflects it normally in a forwards direction. This thus constitutes a "sidelight" function, projecting a small quantity of light in front of the vehicle serving to mark the vehicle rather than to illuminate its path.

Figure 5B:
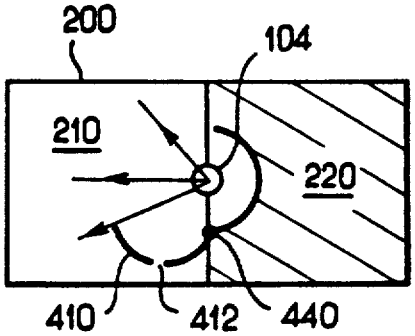

In FIG. 5b, the masking screen 410 is open. This situation is equivalent to that shown in FIG. 4a, and the headlight emits a dipped beam.

Figure 5C:
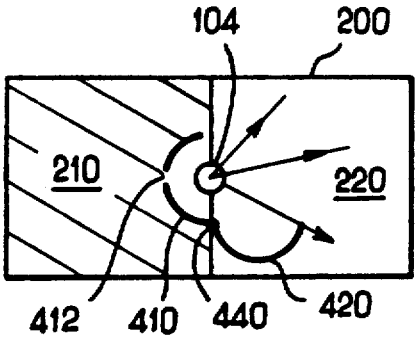

FIG. 5c shows the case where the masking screen 410 is closed while the masking screen 420 is open. Only the zone 220 of the reflector participates in forming a beam, and as a result the beam is an ordinary main beam concentrated on the optical axis.

Figure 5D:
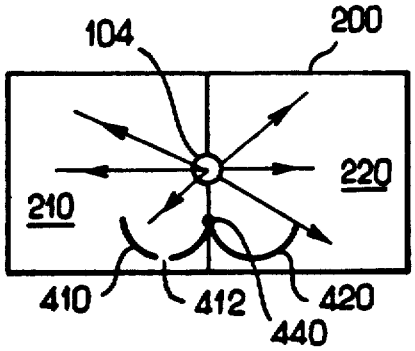

Finally, FIG. 5d shows a last possibility offered by this reflector: by opening both screens 410 and 420 simultaneously, the main beam is superposed on the dipped beam, thereby obtaining an extremely powerful beam providing visual comfort both at a distance and closer to the vehicle.

Thus, without requiring any electrical switching of the lamp, but by appropriately controlling the means for displacing the masking screens, this headlight is capable of providing four lighting functions, all of which are of excellent quality.

Figure 6A:
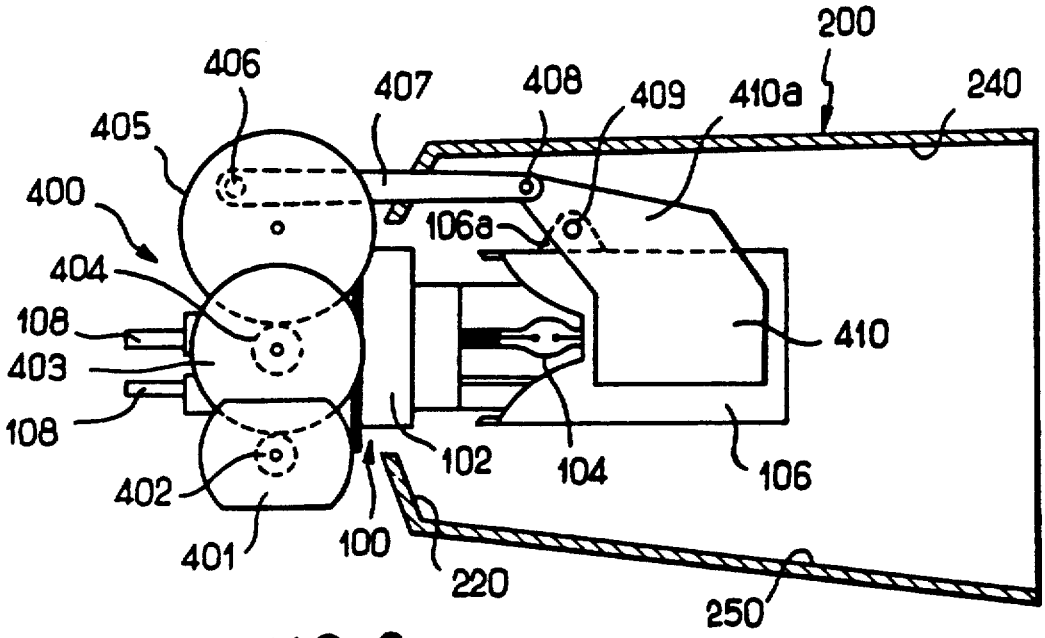
FIGS. 6a and 6b are side views through a specific embodiment of the masking device of the invention shown in two different positions.
Figure 6B:
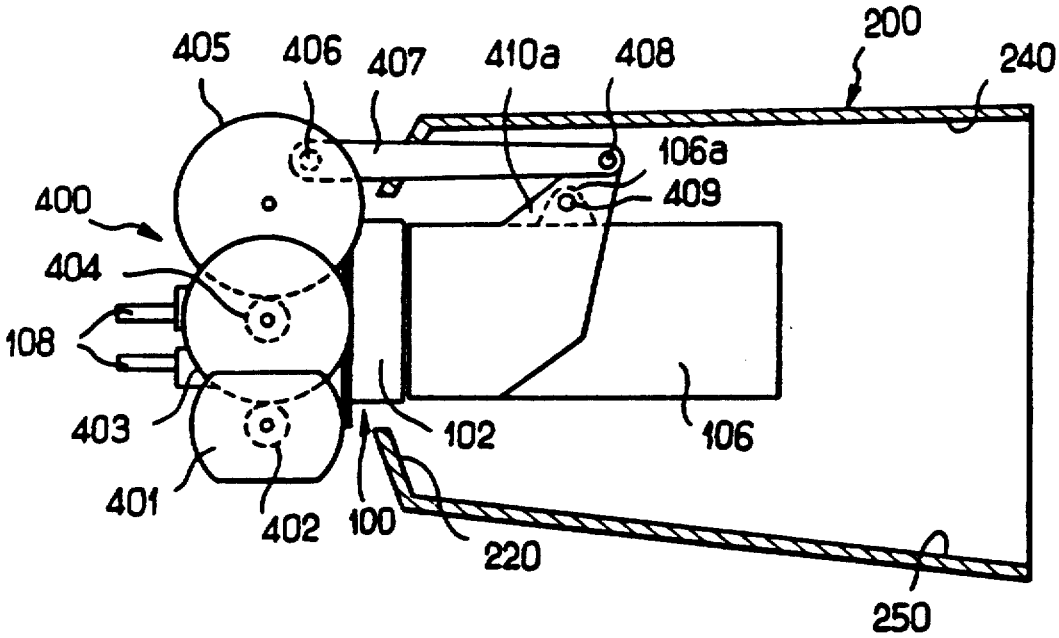

FIGS. 6a and 6b show a practical implementation of the masking means used in the context of the present invention. These figures show a masking screen 410 for selectively masking the lefthand portion 210 (as seen from in front) of the reflector from the radiation delivered by the electric arc.

A common support (not shown) and fixed, for example, &:o the reflector or to the headlight housing, and integrally molded therewith, has a reversible electric motor 401 mounted thereon with its outlet shaft 401a carrying a first gear wheel 402. This wheel meshes with a stepdown gear train constituted by gear wheels 403, 404, and 405. The final gear wheel 405 has an eccentric crank-forming pin 406 to which the first end of a connecting rod 407 is hinged.

The direct light mask 106 is essentially square in right cross-section in this case and it carries a pin 409 on a vertical lug 106a with the masking screen 410 being hinged thereto by a tab 410a. The free end of the tab 410a, i.e. its end opposite from the portion thereof acting as a mask (relative to the pin 409), is provided with a pin 408 having the other end of the connecting rod 407 hinged thereto.

It will be understood that rotation of the motor 401 drives the gear wheels and thus the connecting rod so as to cause the screen 410 to pass from its non-masking or retracted position as shown in FIG. 6a to its masking position as shown in FIG. 6b, and vice versa. In order to ensure that the said screen is accurately positioned in each of its two possible positions, end-of-stroke switches may be provided, for example, at appropriate positions on the transmission, or positioning may be servo-controlled, both of which solutions are well known to the person skilled in the art.

It may be observed that the masking screen 410 has an outline such that, when in the masking position, it masks all of the space situated between the back edge of the mask 106 and the base 102 of the lamp, thereby effectively preventing any radiation from reaching the reflecting zone 210 of the reflector.

The present invention, by placing its reflecting zones side-by-side in combination with using reflecting surfaces which are suitable for forming cut-off beams without requiring a masking screen to participate in forming the cut-off, thus makes it possible firstly to provide two-function headlights having a single source by making use of an arc source known for its high luminosity but not used in the past in practices because the time required to switch between two arcs is incompatible with regulations, and secondly to provide two-function headlights having a single source which are extremely small in vertical extent, thereby satisfying present design requirements well.

By using a single arc source, the present invention also makes it possible to obtain substantial savings compared with headlight systems that include not only two expensive arc lamps, but also two equally expensive power supplies for the lamps.

Naturally, the present invention is not limited in any way to the embodiments described above and shown in the drawings. In particular, although it is particularly advantageous to use a discharge lamp for reasons of light yield, it is clear that the invention is still advantageous when used with conventional tungsten filament sources.

Further, any combination of beams other than that described above may be envisaged. For example, one zone may be provided for forming a standardized European dipped beam as described above, while the other zone may be a parabola which is optionally off-centered or which may have a surface suitable for forming a beam that is complementary to the dipped beam. In the above headlights, it is also possible to replace the zone that forms the dipped beam by a zone which suffices on its own to form a foglight beam, e.g. corresponding to the surface described in French patent application number 2 536,503 in the name of the present Applicant, with the content thereof being hereby incorporated into the present description by reference.

Another possibility consists in the maskable zone 220 being constituted by a portion of a paraboloid focused on the source and giving rise to an extremely concentrated "spot" beam, while the non-maskable zone 210 may have a surface such as that described in French patent application number 2 609 149 which, on its own, suffices for generating a broad main beam.

Finally, numerous variants are possible of the electromechanical masking means as described above. For example, they may be driven by an electromagnet instead of using an electric motor. It is also possible to use masking means which are not electromechanical, e.g. an electro-optical screen suitable for taking up an opaque state and a transparent state, depending on the value of an electrical voltage applied to its terminals.

In general, the person skilled in the art will know how to provide masking means capable of switching fast enough to satisfy regulations, in particular when switching from main beam to dip beam and back again, and when "flashing" headlights.

What is claimed:

1. A motor vehicle headlight of the type comprising a single light source, a reflector including two zones suitable for generating two different respective light beams, a closure glass, masking means situated in the vicinity of the source and capable of being displaced for selectively masking the light rays delivered by the source and propagating toward at least one of the two zones, said two zones disposed side-by-side, each zone extending over the entire height of the reflector, each zone of the reflector comprising a portion of a reflecting surface capable of generating associated beam, said masking means comprising [at least one screen] *two screens*, said [screen] *screens*in [its] masking [position] *positions*situated [to one] *on either* side of the source, at least one of the two zones of the reflector comprising a surface for generating a beam beneath a cut-off extending generally horizontally, the other zone of the reflector comprising a surface suitable for generating a concentrated beam in the vicinity of the optical axis, and said [screen] *screens* adapted to mask the rays propagating from the source toward the [first zone] *two zones* of the reflector and *one screen* having at least one small orifice therethrough in order to allow a determined quantity of light to pass through said screen toward said first zone.

[2. The combination according to claim 1 wherein said at least one zone is defined by a surface adapted to form images of the light source whose top most points are situated in the vicinity of said cut-off.]

[3. The combination according to claim 2 wherein the cut-off is delimited by a horizontal half-plane and by a half-plane sloping above the horizontal.]

[4. The combination according to claim 3 wherein said masking means comprises a single screen for selectively masking propagating from the source toward said other zone.]

[5. The combination according to claim 4 wherein said masking means further comprises a second screen for selectively masking rays propagating from the source toward an associated zone of the reflector.]

[6. The combination according to claim 5 wherein said at least one masking screen comprises a plate pivoted about a horizontal axis fixed to a direct light mask associated with the source, and drive means and associated transmission means for moving said masking screen into a masking position.]

[7. The combination according to claim 6 wherein said drive means comprises an electric motor, and wherein the transmission means comprises a gear and crank system.]

[8. The combination according to claim 7 wherein the source is an arc lamp.]

9. A motor vehicle headlight of the type comprising a single light source, a reflector including two zones suitable for generating two respective light beams, a closure glass, masking means situated in the vicinity of the source and capable of being displaced for selectively masking the light rays delivered by the source and propagating toward at least one of the two zones, said two zones of the reflector disposed horizontally side-by-side, each zone extending over the entire height of the reflector, each zone of the reflector comprising a portion of a reflecting surface defining on its own an associated beam, at least one of the two zones defining a beam limited by a cut-off, the position of the cut-off being independent from the position of the masking means, and said cut-off position defined only by the relative positions of said zone and said source, said masking means comprising at least one screen which in its masking position is located to one side of the source opposite said zone [and] defining a beam limited by cut-off [from] *for* masking the other zone.

[10. The combination according to claim 9 wherein said at least one masking screen comprises a single plate pivoted about a horizontal axis, which horizontal axis is perpendicular to the headlight axis, and means for moving said plate into a masking position.]

[11. The combination according to claim 10 wherein said plate moving means comprises drive means and associated transmission means.]

*12. The combination according to claim 9 wherein a least one zone is defined by a surface adapted to form images of the light source whose top most points are situated in the vicinity of said cut-off.*

*13. The combination according to claim 12 wherein the cut-off is a straight horizontal cut-off.*

*14. The combination according to claim 12 wherein the cut-off is delimited by a horizontal half-plane and by a half-plane sloping above the horizontal.*

*15. The combination according to claim 9 wherein said masking means comprises a single screen for selectively masking propagating from the source toward said other zone.*

*16. The combination according to claim 9 wherein said masking means further comprises a second screen for selectively masking rays propagating from the source toward an associated zone of the reflector.*

*17. The combination according to claim 9 wherein said at least one masking screen comprises a plate pivoted about a horizontal axis fixed to a direct light mask associate with the source, and drive means and associated transmission means for moving said masking screen into a masking position.*

*18. The combination according to claim 17 wherein said drive means comprises an electric motor, and wherein the transmission means comprises a gear and crank system.*

*19. The combination according to claim 9 wherein said source is an arc lamp.*

* * * * *